United States Patent [19]

Boyhont et al.

[11] 4,109,966
[45] Aug. 29, 1978

[54] PNEUMATIC CONVEYING DEVICE

[75] Inventors: Donald S. Boyhont, Nazareth; Paul E. Solt, Allentown, both of Pa.

[73] Assignee: Fuller Company, Catasauqua, Pa.

[21] Appl. No.: 744,586

[22] Filed: Nov. 23, 1976

[51] Int. Cl.² .............................................. B65G 53/48
[52] U.S. Cl. ..................................... 302/50; 198/669; 198/671; 198/672
[58] Field of Search ................... 302/50; 198/669, 671, 198/672

[56] References Cited

U.S. PATENT DOCUMENTS

| 1,677,119 | 7/1928 | Kinyon | 302/50 |
| 2,132,980 | 10/1938 | Woolley et al. | 302/50 |
| 2,299,470 | 10/1942 | Davis | 302/50 |
| 2,393,412 | 1/1946 | Riddell | 302/50 |
| 2,973,855 | 3/1961 | Pro | 198/671 |
| 4,015,754 | 4/1977 | Leurs et al. | 222/194 |

FOREIGN PATENT DOCUMENTS

| 699,962 | 11/1953 | United Kingdom | 198/669 |
| 1,435,444 | 5/1976 | United Kingdom | 302/50 |

Primary Examiner—Evon C. Blunk
Assistant Examiner—Jeffrey V. Nase
Attorney, Agent, or Firm—Frank H. Thomson

[57] ABSTRACT

Apparatus for conveying solid particulate material including a casing having bore therethrough and an inlet for material to be conveyed and an outlet. A screw impeller is rotatably mounted in the casing by front and rear bearings with the rear bearing being near the inlet. The outlet is intermediate the inlet and the forward bearing. A discharge chamber is flow connected immediately adjacent the casing outlet. Nozzles for supplying gas under pressure are provided in the discharge chamber for discharging material from the discharge chamber into and through a pneumatic conveying line. The screw impeller includes a feed screw section which terminates adjacent the casing outlet and a reversing section with reverse flights between the forward bearing and the casing outlet to prevent material from entering the forward bearing. A restriction plate may be placed in the casing outlet to reduce the size of the outlet opening to less than the bore through the casing. A flap valve is provided which swings away from the casing outlet and discharge chamber inlet for establishing an initial material seal.

8 Claims, 6 Drawing Figures

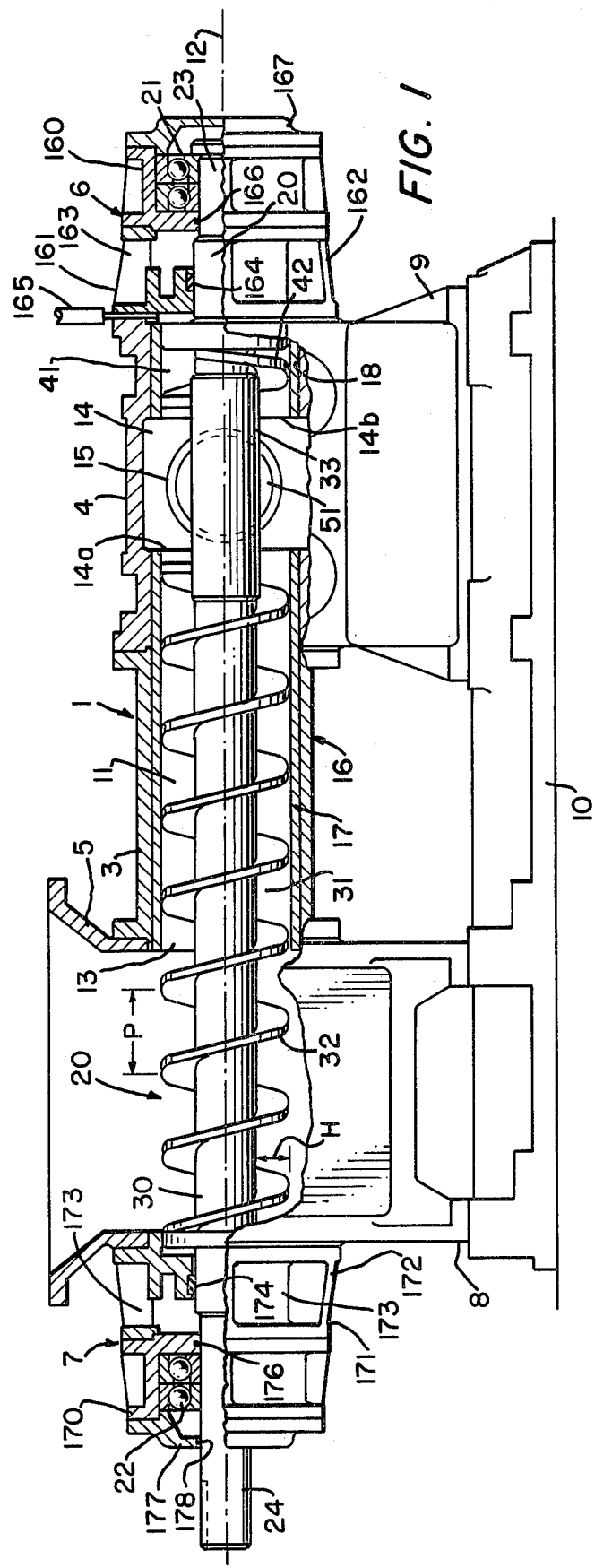
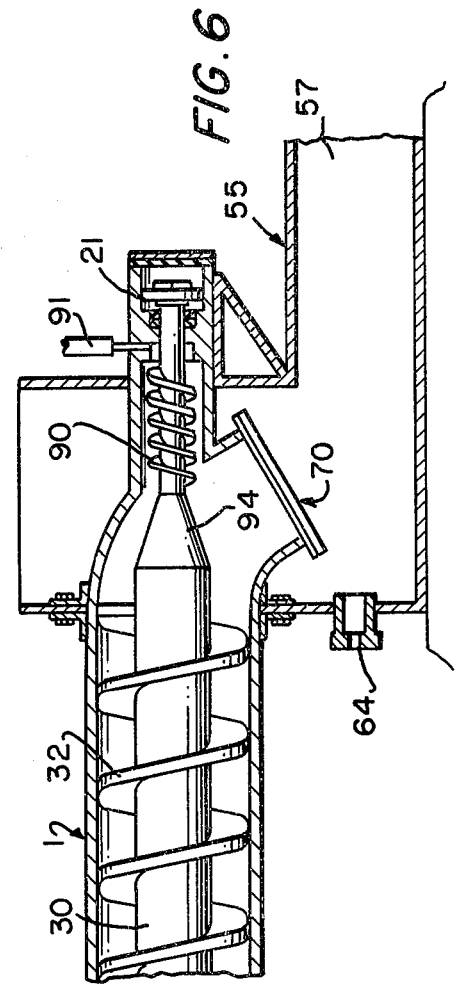
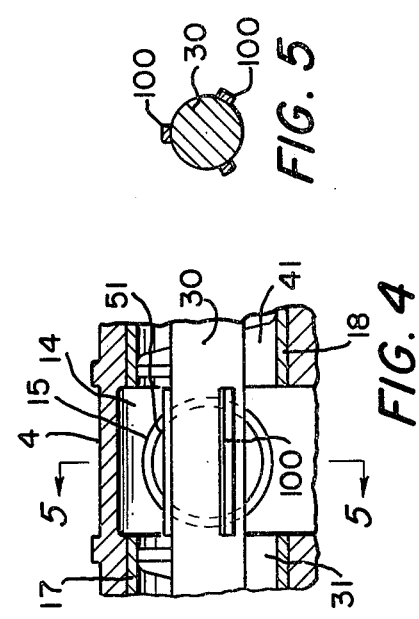

PNEUMATIC CONVEYING DEVICE

BACKGROUND OF THE INVENTION

The present invention relates to an improvement on prior U.S. application, Ser. No. 340,486, filed Mar. 12, 1973, now abandoned, which is similar to corresponding British patent specification No. 1,435,444.

Prior to the present invention it was generally known to provide a pneumatic conveying device consisting of a screw impeller rotatably mounted within the bore of a casing for transporting material from a source such as a hopper flow connected to the inlet of the casing through the bore to a casing outlet. Material is discharged from the casing outlet into a discharge chamber or wind box. Gaseous fluid under pressure is supplied to the discharge chamber for conveying material out of the discharge chamber and through a pneumatic conveying line.

Early designs of pneumatic conveying apparatus of the type to which the present invention relates were generally as shown in U.S. Pat. No. 1,677,119, issued July 10, 1928. This design employed a front and rear bearing to rotatably support the screw impeller at both ends. A compressing screw formed by either a reducing pitch screw or a reducing diameter casing bore or an increasing diameter screw impeller shaft or a combination thereof served to compact material within the casing bore to thereby form a material seal in the casing bore between the material outlet of the casing and the material inlet of the casing. This material seal served to prevent "blow back" from the discharge chamber into the feed material hopper, i.e. prevent air under pressure from short circuiting into the material feed hopper through the bore in the casing rather than conveying material out of the discharge through the pneumatic conveying line.

A later development in pneumatic conveying apparatus to which the present invention relates is generally shown in U.S. Pat. No. 2,299,470, issued Oct. 20, 1942. In that apparatus, the front bearing supporting the screw impeller of the earlier design was eliminated. An overhung screw impeller supported by a rear bearing is employed. The front end of the screw impeller is kept centered within the bore or pump barrel by employing a heavy impeller shaft and by keeping the pump barrel full of material.

In both the design of U.S. Pat. No. 1,677,119 and U.S. Pat. No. 2,299,470, the material outlet was coextensive with the end of the pump barrel or bore through the casing. In the design of U.S. Pat. No. 1,677,119, the outlet of the casing is immediately upstream of the source of conveying gas and the beginning of the conveying line. In U.S. Pat. No. 2,299,470, the outlet of the casing discharges material into a wind box or discharge chamber. This discharge chamber has an outlet connected to a pneumatic conveying line. Air under pressure is supplied through jets into the discharge chamber for entraining material and conveying it through the conveying line.

A further difference between the design of U.S. Pat. No. 1,677,119 and the design of U.S. Pat. No. 2,299,470 is the use of a normally closed flap valve in the later patent for closing the outlet of the casing. During initial start-up of the pump, this valve serves to assist the compressing screw in forming a material seal at the outlet to prevent "blow back" of air through the pump casing. Once the material seal is formed, the flap valve will swing into the discharge chamber away from the casing outlet and remain open so long as material is being conveyed through the casing.

Although the device of U.S. Pat. No. 2,299,470 resulted in improved operation due to the addition of the discharge chamber and flap valve, the lack of a front bearing for supporting the screw resulted in maintenance problems with the screw due to the overhung design. This is particularly true with large capacity apparatus where the screw is heavy and when the apparatus is operated at less than capacity. As long as the apparatus is operated at capacity, the material in the casing bore will assist in supporting the front of the screw. When the apparatus is operated at less than capacity, the support provided by the material is no longer available. The lack of front end support of a heavy screw permits the screw to droop. As the screw rotates, it will whip causing the screw flights to make excessive contact with the casing bore thereby reducing the life of the screw and/or the pump barrel lining. Each time the wear on the flights or the barrel lining exceeds a given amount, the screw and/or barrel lining must be changed. This causes a shut-down of the equipment.

Therefore, each of the prior apparatus had its advantages and its disadvantages. The front and rear bearings provided the advantage of two supports for the conveying device screw, but the disadvantage of difficulty of establishing a material seal during start-up. The second generation had the advantage of ease of establishing a material seal during start-up, but the disadvantage of reduced wear life of the screw due to the single support for the screw.

Various attempts have been made to combine the advantages of using both front and rear bearings for supporting the screw impeller and a valve at the discharge of the pump casing. Such attempts are shown, for example, by U.S. Pat. Nos. 1,545,230; 2,489,980; 3,314,733; and 3,704,917. None of these apparatus have become commercially successful. Each presents problems such as the inability of the valve at the outlet of the casing to operate over long periods of time without interfering with the operation of the apparatus or becoming fouled due to its direct placement within the flow of material. An attempt to provide a double support screw impeller while combining a flap valve to establish a material seal during start-up was set forth in U.S. patent application Ser. No. 340,486, filed Mar. 12, 1973. This apparatus employs a first section of a screw impeller having a standard compressing screw, i.e. screw flights which reduce in pitch toward the casing outlet, and a second screw section with reverse flights for preventing material from entering the forward bearing. The material outlet from the casing is at right angles to the bore through the casing and a plate interconnects the two screw flights at the casing outlet. It was found during testing of this apparatus that the flap valve would constantly open and close with great rapidity producing a constant banging of the flap valve with the result that the flap valve tended to shake itself apart and conveying capacity was affected. A further result was that the expected increased wear life of the screw impeller and device as a whole did not materialize.

Other prior attempts at providing a pneumatic conveying apparatus employing front and rear bearings for supporting a screw impeller with an outlet intermediate the bearings and at an angle to the bore in the casing are shown in U.S. Pat. Nos. 2,132,980 and 2,393,412. The apparatus illustrated in these patents are designed for low capacity, short distance conveying and are not adapted to provide an adequate seal for conveying high capacities over long distances.

With prior apparatus of the type to which the present invention relates, the amount of horsepower required to turn the screw impeller was often greater than desirable. It is believed that this is at least partially due to the requirement that with prior apparatus, the impeller was rotated within compacted material and a material seal of excessive length is required.

SUMMARY

It is therefore the principal object of this invention to provide a pneumatic conveying device which will overcome the disadvantages of prior art designs.

It is another object of this invention to provide an apparatus for conveying purverulent material which will permit conveying at less than capacity without severely affecting the wear life of the screw impeller of the device.

It is a further object of this invention to provide a pneumatic conveying device which will have improved bearing wear life.

It is a still further object of this invention to provide a pneumatic conveying device which will have increased capacity for a given size with the potential of requiring fewer maintenance shutdowns.

It is still another object of this invention to provide a pneumatic conveying apparatus which can be operated with less horse power than prior apparatus.

In general, the foregoing and other objects will be carried out by an apparatus for conveying pulverulent material comprising a casing having a bore therethrough and an inlet for pulverulent material to be conveyed and an outlet for discharging pulverulent material; a screw impeller rotatably mounted in the bore in said casing for advancing pulverulent material from said inlet to said outlet; a pair of bearing means including a forward bearing means and a rear bearing means, each operatively connected to one end of said casing for mounting said screw impeller in the bore of said casing whereby the screw impeller is rotatably supported near both ends; said outlet being located intermediate the forward bearing means and the rear bearing means and being at an angle to the longitudinal axis of the bore in the casing and having forward and rear edges; said screw impeller including a feed section which extends forwardly from said inlet and terminating at approximately the rear edge of said outlet for advancing pulverulent material from said inlet to said outlet; and means for substantially preventing pulverulent material from entering said forward bearing means.

BRIEF DESCRIPTION OF THE DRAWINGS

The invention will be described in connection with the annexed drawings wherein:

FIG. 1 is an elevation view, partly in section, showing the pneumatic conveying device of the present invention;

FIG. 4 is a fragmentary sectional view of a modification of the present invention;

FIG. 5 is a secional view taken on the line 5—5 of FIG. 4 showing a portion of the modification of FIG. 4; and FIG. 6 is a further modification of the present invention.

DESCRIPTION OF THE PREFERRED EMBODIMENTS

Figure 2:
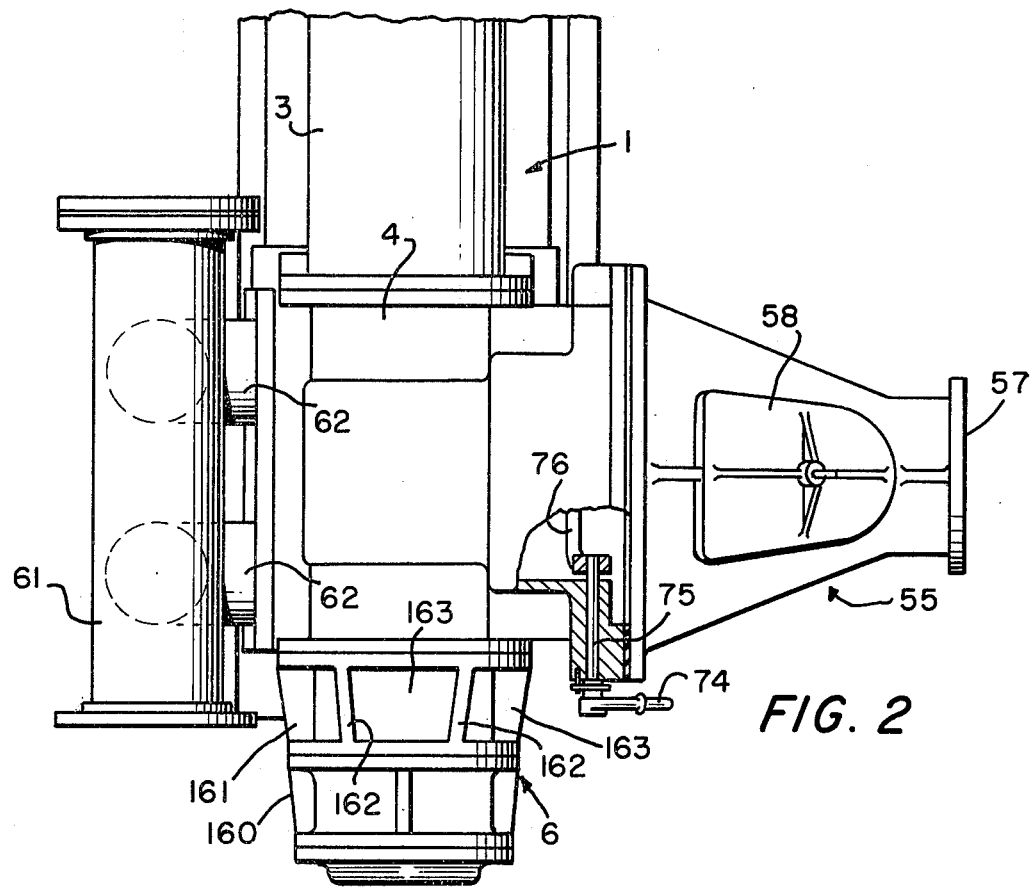
FIG. 2 is a plan view, partly in section, showing the apparatus of the present invention.
Figure 3:
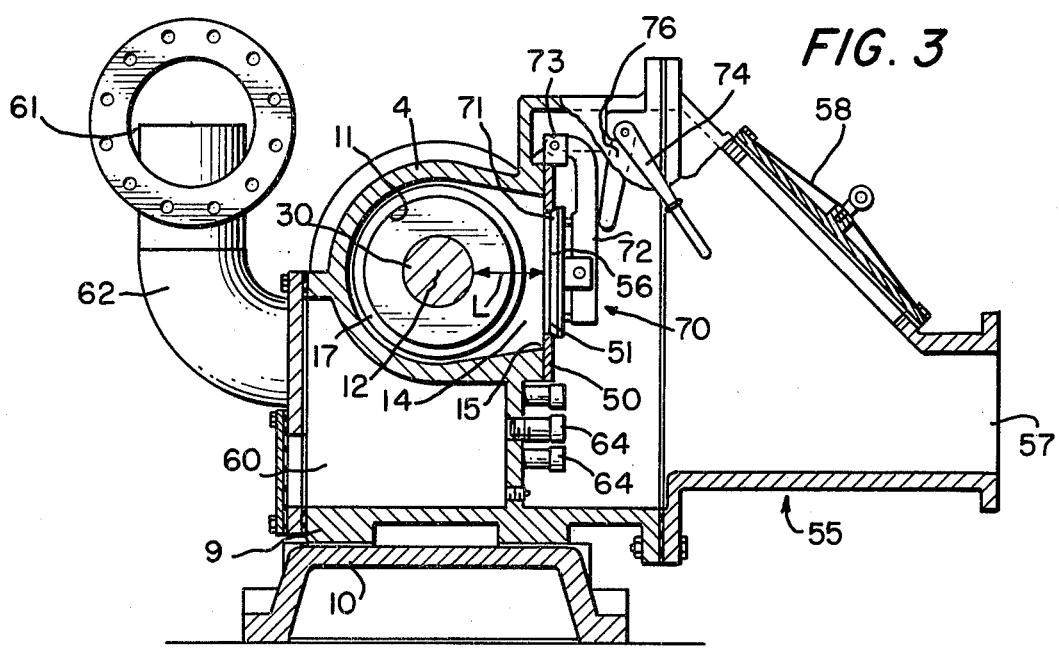
FIG. 3 is a sectional view taken on the line 3—3 of FIG. 1.

Referring to the drawings and in particular FIGS. 1 to 3, there is shown a pneumatic conveying device or pump according to the present invention which includes a casing generally indicated at 1 formed by a hollow cylindrical portion 3 and a hollow forward portion 4 suitably secured to each other. A material feed hopper 5 adapted to be connected to a source of material (not shown) is secured to the cylindrical portion 3. The casing also includes a forward support housing generally indicated at 6 secured to hollow forward portion 4 and a rear support housing generally indicated at 7 secured to hopper 5. The hopper 5 and hollow forward section 4 are secured to pedestals 8 and 9, respectively, for mounting the device on a base 10. The pedestal 8 may include a material trap (not shown) for removing tramp material in hopper 5.

The casing 1 has a bore 11 therethrough which has a longitudinal axis 12. The bore 11 has an inlet 13 for material to be conveyed which inlet 13 is at the end of the hollow cylindrical portion 3 and opens into the hopper 5. The casing 1 and the bore 11 also include a material outlet section 14 which is formed as an enlarged section on one side of the bore 11 within the hollow forward portion 4 of the casing 1. The material outlet section 14 includes a rear edge 14a and a forward edge 14b and an opening 15 which is perpendicular to the longitudinal axis 12 of the bore 11 through the casing 1.

The bore 11 is preferrably provided with a barrel liner generally indicated at 16 which may include a first section 17 extending from the inlet 13 of the bore 11 to the rear edge 14a of the outlet section 14 and may be formed of one piece as shown or several pieces. The barrel line 16 also includes a second section 18 coaxially aligned with the first section 17 and extending from the forward edge 14b of the outlet section 14 to the forward support housing 6. Although the apparatus has been shown with a split barrel liner 16 with no barrel liner in the outlet section 14, it should be understood that it may be desirable to extend the barrel liner through the outlet section 14 and provide an outlet opening in the side thereof aligned with outlet opening 15. As a further alternate it may be deisrable to extend sections 17 and 18 beyond edges 14a and 14b.

A screw impeller generally indicated at 20 is rotatably mounted within the bore 11 of casing 1 by means of a forward bearing 21 operatively connected to the casing 1 by being mounted within forward support housing 6, and a rear bearing 22 operatively connected to the casing 1 by being mounted within rear support housing 7. Together the forward bearing means 21 and rear bearing means 22 constitute a pair of bearing means, which rotatably support the ends 23 and 24 of the screw impeller 20. The rear end 24 of the screw impeller is adapted to be connected in any suitable manner to a means such as a motor (not shown) for rotating the screw impeller 20 about its own axis which is coextensive with the axis 12 of the bore 11.

Referring more specifically to the means for supporting the screw impeller 20 and the forward support housing 6 and rear support housing 7, a support system unique to apparatus of the type to which the present invention relates is employed. The forward support housing 6 includes a forward bearing housing 160 and an intermediate section 161 which is mounted on the forward portion 4 and has the bearing housing 160 secured thereto. The intermediate section 161 may be a casting including spaced apart webs 162 which define air gaps 163 which leave openings between the impeller 20 and atmosphere. The intermediate section also confines a material seal 164 between the bore 11 and air gap 163 which surrounds impeller 20. The intermediate section 161 includes means 165 rearward of material seal 164 supplying purge air from a source (not shown) to the bore 11. The forward bearing housing 160 houses forward bearing 21 and a lubricant seal 166. An end cap 167 closes the front end of the forward support means 6 and the apparatus as a whole.

The rear support means 7 includes a rear bearing housing 170 and an intermediate section 171 both of which are substantially identical to the forward bearing housing 160 and intermediate section 161. The intermediate section 171 is mounted on hopper 5 and has rear bearing housing 170 secured thereto. The section 171 may be a casting including spaced apart webs 172 which define air gaps 173 leaving openings between impeller 20 and atmosphere. The intermediate section 171 confines a material seal 174 which, like material seal 164, surrounds impeller 20. The rear bearing housing 170 houses rear bearing 22 and includes a lubricant seal 176. An end cap 177 closes the end of the rear support means 7 and the apparatus as a whole and surrounds the end 24 of impeller 20. A lubricant seal 178 is provided in cap 177.

The material seals 164 and 174 serve as barriers between the bore 11 and bearing 21 and the hopper 5 and bearing 22, respectively. The air gaps 163 and 173 serve the function of providing an escape point for any material which gets past seals 164 and 174 by allowing the material to drop to the floor or be blown into atmosphere rather than being forced into bearings 21 and 22.

The screw impeller 20 includes a shaft 30 having a substantially uniform diameter throughout its length and a feed section 31 including a flight 32 having substantially uniform height H throughout its length and a substantially uniform pitch P throughout its length. The shaft 30 has been shown with a slightly increased diameter section at 33 within the outlet section 14 which section 33 is a build up of hard surfacing for improving wear life. The first section 31 extends from near the rear support housing 7 through the hopper 5 and casing inlet 13 and terminates at approximately the rear edge 14a of the outlet section 14. Because the bore 11 and shaft 30 are of substantially uniform diameter throughout their length and because the height H of the flights 32 and the pitch P of the flights 32 are substantially constant throughout their length, the feed or first section 31 forms a noncompressing screw. It should be understood that although the preferred embodiment utilizes a noncompressing screw, a compressing feed section 30 formed by a decreasing pitch flights 32, increasing diameter shaft 30 or decreasing diameter bore 11, or combination thereof may be used and is contemplated by the present invention.

The screw impeller 20 also includes a second or reversing section 41 having flights 42 which are in a direction opposite to the direction of flights 32 of the first or feed section 31. The reversing section 41 extends rearwardly from near the forward bearing means 21 or support housing 6 and terminates at approximately the forward edge 14b of the outlet section 14. This second section 41 together with the air purge 165, material seal 164 and air gap 163 serve the function of providing means for preventing material from entering the forward bearing 21. As the screw impeller 20 is rotated, material will be conveyed from the hopper 5, inlet 13, through bore 11 to the outlet section 14. Some material will inherently pass outlet section 14 and absent the second section 41 would tend to be forced into the support housing 6. The flights 42 of the screw impeller 20 serve to prevent this from happening by continuously conveying any material away from housing 6 and bearing 21 back to outlet 14. Any material which gets past the reversing section 41 will be forced into section 41 by compressed air from purge line 165. Likewise any material which escapes purge line 165 or if line 165 is plugged will be stopped by material seal 164. Should seal 164 fail, the material will fall to the floor or be blown to atmosphere through air gaps 165.

A plate 50 best shown in FIG. 3 is mounted on the outlet opening 15 of the casing and has an opening 51 therein which is smaller in diameter than the diameter of bore 11, the diameter of opening 15 and the diameter of the impeller 20 to thereby provide a slight restriction within the outlet section 14 of the casing 1.

A discharge hopper or wind box best shown in FIGS. 2 and 3 and generally indicated at 55 is mounted on the casing 1 and includes an inlet 56 immediately adjacent the outlet opening 51 of plate 50. The discharge chamber 55 also includes a material outlet 57 which is adapted to be connected to a transport line or pneumatic conveying system (not shown) which may consist of piping of appropriate diameter and any desired valving. The discharge chamber 55 may include an inspection and cleanout port with cover 58.

The discharge chamber 55 is provided with means for supplying gaseous fluid under pressure thereto for entraining solid particulate material supplied to the discharge chamber from hopper 5 and conveying such material through the outlet 57 and the pneumatic conveying system to which it is connected. This gaseous fluid supply means include a plenum chamber 60 which forms part of pedestal 9 and is supplied with gaseous fluid under pressure from a compressor (not shown) through air conveying lines 61 and 62. A plurality of jets 64 permit the gaseous fluid to be supplied from the plenum chamber 60 into the discharge chamber 55. The air under pressure from these jets 64 entrains the pulverulent material supplied to the wind box 55 from the outlet 14 of the casing 1 and conveys such material through the transport line.

A normally closed flap valve generally indicated at 70 is provided and includes a valve plate 71 which serves to close discharge hopper inlet 51 and outlet opening 56 and is mounted on a hinge plate 72 which is pivotally mounted at 73 within discharge chamber 55. A handle 74 enables weight to be applied to the valve member 71 through shaft 75 and link 76 which bears against hinge plate 72. This system enables the amount of weight applied to the valve 70 to be varied as desired for a particular application to vary the force required to open the valve 70. Once the material seal has been established, the valve 70 has substantially no further effect until conveying is stopped. The weight applied through links 75 and 76 then closes the valve.

In operation of the apparatus, material to be conveyed is supplied through hopper 5 to the material inlet 13 of the casing 1. As the screw impeller 20 is rotated, material will be advanced from the hopper 5 into inlet 15 toward the outlet section 14. Material is prevented from backing into rear bearing 22 by material seal 174 and air gap 173. The normally closed valve 70 will cause a material build up within bore 11 until a material seal is formed within outlet section 14. The valve 70 will then swing open permitting material to be discharged into chamber 55 through the opening 51 in plate 50 and discharge chamber inlet 56. Gaseous fluid under pressure from conduits 61 and 62 and plenum chamber 60 is supplied through jets 64 to entrain material in chamber 55 and discharge it through outlet 57 and convey the material through the transport line. The restriction formed by plate 50 serves to maintain the material seal within the material outlet section 14.

It should be obvious that the present invention has provided a pneumatic conveying device which has the advantage of the earliest designs of equipment of this type in that it has a dual support for the screw impeller provided by forward bearing means 21 and rear bearing means 22. Even if the apparatus is operated at less than capacity or, in fact empty, the dual bearing support will insure that the screw impeller 20 rotates true within the bore 11. Reliance is not placed upon a bore 11 which is full of material to center the impeller 20 within the bore during rotation. The advantage of establishing an initial material seal during start-up by the use of a flap valve has been maintained. Prior double bearing arrangements did not permit this, as does the side discharge or perpendicular outlet of the present invention. Suprisingly, the use of a compressing screw is not required by the present invention, although there may be applications where its use is desirable. The area 14 in which a material seal is formed is sufficient to prevent the short-circuiting of compressed gas from the discharge chamber 55 through openings 15 and 51 into inlet 13 and the material hopper 5. The lack of a connection between the feed section 31 and the reversing section 41 of the screw impeller 20 eliminates the rapid opening and closing of the valve which was the experience with the design of U.S. patent application Ser. No. 340,486, filed Mar. 12, 1973.

It has been found that the length of the material seal formed to prevent "blow back" is important. If the length of the sealing area is too short, i.e. the distance between shaft 30 and opening 15 within outlet section 14 is too short, then more weight must be added to the handle 74 to provide more resistance to the opening of flap valve 70. Since the flap valve 70 is primarily effective during initial start-up, it is desirable to have as little weight as possible applied to the valve 70 since once operation is established, the weight on the valve 70 is something that must be overcome by the material being conveyed which means that additional horsepower will be required. If the length of the sealing area is too long; the distance between the shaft 30 and the outlet openings 15 and 51 in section 14 is too great, then the horsepower required to rotate the screw impeller will be larger than is desirable because the impeller must be rotated against more compressed material. The length L of the seal between shaft 30 and outlet opening 15 can be reduced by increasing the diameter of shaft 30 within the outlet section 14 or by the addition of a plurality of flingers 100 to the shaft 30 in the outlet section 14 as shown in the modification of FIGS. 4 and 5. These flingers may be formed from bar stock material and be dimensioned as desired to provide the desired seal distance L which will now be measured from the outer edge of the flingers 100 to the outlet opening 15. Three spaced apart flingers 100 have been shown, but it is to be understood that more or less in number are contemplated by the present invention.

In the modification of FIG. 6 the outlet section 14 and opening 15 of the casing 1 is at an acute angle to the longitudinal axis of the casing bore 11. This acute angle serves to give a directional force to material being discharged from the casing into the discharge chamber 55. With such an apparatus a smaller diameter second section or reverse flight section 90 may be used to replace the second section 41 used in the embodiment of FIGS. 1 to 3. The purge air line has been shown at 91 to assist the screw flights 90 in preventing material from entering the forward bearing means 21. With a smaller second section 90 the screw section 31 is connected to the second section by a tapered portion 94. The restriction plate 50 of FIG. 3 has not been shown in FIG. 6, and the flap valve 70 has been shown diagrammatically, but these may be added to FIG. 6 if desired. The important thing is the two bearing supports and the use of a non-compressing screw impeller.

From the foregoing, it should be apparent that the object of this invention has been carried out. Apparatus has been provided for conveying solid particulate or pulverulent material which is capable of conveying large capacities over a great distance. Maintenance of wearing parts will be substantially reduced since the potential for screw and barrel liner wear when operating at less than capacity has been substantially reduced or eliminated.

A novel bearing arrangement has been provided which will substantially reduce bearing failure due to pulverulent material getting into the bearings and permits changing of the material seal during a scheduled shut-down rather on an emergency basis. The length of bearing life is increased because of the multiple protection arrangement. At the rear bearing this is accomplished by the material seal and the air gap. At the front bearing, this is accomplished by the reverse flights, the air purge, the material seal and the air gap. If the material seals at the front and rear bearing fails, material will still not get into the bearings because of the air gap. The operator will realize that the material seals have failed due to material fall out through the air gaps 163 and 173. Although such material leakage from the air gaps is undesirable from a housekeeping and environmental standpoint, the operator can continue to operate the apparatus without replacing the material seals until a scheduled shutdown because the air gap provide an escape to atmosphere for the material and will prevent material from entering and ruining bearings 21 and 22.

The apparatus enables the establishment of a material seal by the use of a flap valve which insures proper operation at start-up and thus prevents blow back of compressed gas to the feed hopper. It is believed that capacity will be increased through the use of the dual bearings and absence of a compressing screw. An arrangement has been provided to optimize the length of the material seal to thereby provide a means for reducing the horsepower requirements of the apparatus.

The present invention may also have use in applications other than the pneumatic conveying of material through a transport line. For example, it may be desired to supply particulate material such as ground coal into a pressure vessel such as a coal gasification reactor. In such an application, the wind box or discharge chamber and associated air jets would be eliminated and the pressure vessel would be attached directly to the outlet 15 of the bore 11. In such an application, pulverulent material would be extruded out of the opening 15 into the receiver vessel.

It is intended that the foregoing be merely a description of a preferred embodiment and that the invention be limited solely by that which is within the scope of the appended claims.

We claim:

1. Apparatus for conveying pulverulent material comprising:
    a casing having a forward end and a rear end, a bore therethrough and an inlet for pulverulent material to be conveyed and an outlet for discharging pulverulent material;
    a screw impeller rotatably mounted in the bore in said casing for advancing pulverulent material from said inlet to said outlet;
    a pair of bearing means including a forward bearing means and a rear bearing means, each operatively connected to one end of said casing for mounting said screw impeller in the bore of said casing whereby the screw impeller is rotatably supported near both ends;
    said outlet having forward and rear edges and being located intermediate the forward bearing means and the rear bearing means and being at an angle to the longitudinal axis of the bore in the casing;
    said screw impeller including a shaft, a feed section which extends forwardly from said inlet and terminating at approximately the rear edge of said outlet for advancing pulverulent material from said inlet to said outlet and a reversing section extending rearwardly from near said forward bearing means and terminating at approximately the forward edge of said outlet and spaced from the feed section of the screw impeller;
    means for substantially preventing pulverulent material from entering said forward bearing means;
    a forward support means mounted on the forward end of said casing for operatively connecting the forward bearing means to the forward end of the casing and including a forward bearing housing for housing the forward bearing means and an intermediate section positioned between the forward end of the casing and said forward bearing housing;
    said means for substantially preventing pulverulent material from entering said forward bearing means including said reversing section of the screw impeller, a material seal surrounding said screw impeller and confined by said intermediate section adjacent to the forward end of said casing and said intermediate section defines at least one opening between said screw impeller and atmosphere for allowing pulverulent material which may escape from the bore of said casing past said material seal to be discharged to atmosphere;
    said outlet being spaced laterally from said shaft; and
    means mounted on said shaft adjacent said outlet having a height less than the height of the feed section for reducing the effective distance between said shaft and said outlet whereby a material seal is formed having a length equal to approximately the distance between the outlet and the means for reducing the effective distance.

2. Apparatus for conveying pulverulent material according to claim 1 wherein said outlet is smaller than the diameter of the bore through the casing.

3. Apparatus for conveying pulverulent material according to claim 1 wherein said bore through said casing is substantially uniform in diameter throughout its length and said screw impeller includes a shaft having a substantially uniform diameter throughout its length and said feed section of said screw impeller is a helical flight having a substantially uniform height and pitch throughout its length to thereby define a noncompressing feed section.

4. Apparatus for conveying solid particulate material comprising:
    a casing having an inlet for solid particulate material to be conveyed and an outlet for discharging solid particulate material and a forward end and a rear end;
    said outlet having a forward edge and a rear edge;
    a screw impeller mounted in said casing for advancing solid particulate material from said inlet to said outlet;
    a pair of bearing means including a forward bearing means and a rear bearing means, each operatively connected to one end of said casing for mounting said screw impeller in said casing whereby said screw impeller is rotatably supported near both ends;
    a discharge chamber for introducing solid particulate material into a pneumatic conveying system and having an inlet immediately adjacent the outlet of the casing and an outlet connected to the pneumatic conveying system;
    said screw impeller including a shaft, a feed section which is substantially noncompressing and extending forwardly from the inlet of the casing and terminating at approximately the rear edge of the outlet of the casing for advancing solid particulate material from the casing inlet to the casing outlet, and a reversing section spaced from said feed section and extending rearwardly from near said forward bearing means and terminating at approximately the forward edge of the outlet of the casing for advancing material away from said forward bearing means to said outlet of the casing;
    means for supplying gaseous fluid under pressure to said discharge chamber for conveying solid particulate material from said discharge chamber through said outlet of said discharge chamber and said pneumatic conveying system;
    a normally closed flap valve openable by means of pressure exerted by solid particulate material being advanced by said screw impeller and being swingable away from the outlet of the casing and the inlet of the discharge chamber;
    plate means mounted in the outlet of said casing having an opening therethrough smaller in diameter than the diameter of said screw impeller for maintaining a material seal between the plate means and said shaft intermediate said feed section and said reversing section; and
    means mounted on said shaft intermediate said feed section and said reversing section having a height less than the height of said feed section for reducing the effective length of the material seal while maintaining said material seal.

5. Apparatus for conveying solid particulate material according to claim 4 wherein said means mounted on said shaft intermediate said feed section and said reversing section includes a plurality of circumferentially spaced apart flingers, each having a height less than the height of said feed section.

6. Apparatus for conveying solid particulate material according to claim 4 further comprising a forward support means mounted on the forward end of said casing for operatively connecting the forward bearing means to the forward end of the casing and including a forward bearing housing for housing the forward bearing means and an intermediate section positioned between the forward end of the casing and said forward bearing housing; means for substantially preventing solid particulate material from entering said forward bearing means including said reversing section and a material seal surrounding said screw impeller and confined by said intermediate section adjacent to the forward end of said casing, and said intermediate section defines at least one opening between the screw impeller and atmosphere for allowing solid particulate material which may escape past said reversing section and said material seal to be discharged to atmosphere.

7. Apparatus for conveying solid particulate material according to claim 6 further comprising air purge means intermediate the reversing section of the screw impeller and the material seal.

8. Apparatus for conveying solid particulate material according to claim 6 further comprising a rear support means mounted on the rear end of said casing for operatively connecting the rear bearing means to the rear end of the casing and including a rear bearing housing for housing the rear bearing means and an intermediate section positioned between the rear end of the casing and said rear bearing housing; a material seal surrounding said screw impeller and confined by said intermediate section adjacent to the rear end of said casing, and said intermediate section defines at least one opening between the screw impeller and atmosphere for allowing solid particulate material which may escape past the material seal to be discharged to atmosphere.

* * * * *